(12) United States Patent
Rusnak (10) Patent No.: US 6,481,596 B1
(45) Date of Patent: Nov. 19, 2002

(54) METERING DEVICE

(75) Inventor: Christopher Rusnak, Des Plaines, IL (US)

(73) Assignee: Ideal Instruments, Inc., Schiller Park, IL (US)

( * ) Notice: Subject to any disclaimer, the term of this patent is extended or adjusted under 35 U.S.C. 154(b) by 0 days.

(21) Appl. No.: 09/904,318

(22) Filed: Jul. 12, 2001

(51) Int. Cl.⁷ .................................................. B67D 5/22
(52) U.S. Cl. ........................ 222/1; 222/309; 222/340; 222/43
(58) Field of Search ......................... 222/43, 309, 318, 222/340, 402.16, 41–44; 251/74, 44, 116, 109

(56) References Cited

U.S. PATENT DOCUMENTS

| | | | |
|---|---|---|---|
| 3,830,410 A | * | 8/1974 | Magrath et al. ............. 222/309 |
| 3,975,960 A | * | 8/1976 | Croslin ....................... 222/309 |
| 4,006,847 A | | 2/1977 | Dooley |
| 4,007,855 A | | 2/1977 | Hierath et al. |
| 4,055,281 A | | 10/1977 | Rosen et al. |
| 4,293,010 A | | 10/1981 | Winiasz |
| 4,488,663 A | | 12/1984 | Hooper et al. |
| 4,650,099 A | | 3/1987 | Paulsen et al. |
| 4,821,927 A | | 4/1989 | Paulsen et al. |
| 5,458,275 A | | 10/1995 | Centea et al. |

* cited by examiner

Primary Examiner—Henry C. Yuen
Assistant Examiner—Stephanie Willat
(74) Attorney, Agent, or Firm—Ian C. McLeod (57) ABSTRACT

A device (10) for dispensing a metered amount of liquid from a pressurized source of liquid (100) having a storage container (12), a valve (30) and a metering system. A plunger (16) is slidably mounted in the inner chamber (12D) of the storage container. The metering system includes a dosage ring (26) with a pin (28). The ring mounts on the outer surface of the storage container adjacent a dosage slot. The pin extends through the slot in the sidewall (12C) of the container and into a slot in the sidewall (16C) of the plunger. The pin contacts the bottom end of the slot in the plunger to stop the forward movement of the plunger during dispensing of the liquid stopping the movement of the plunger and stopping the movement of the liquid out of the storage container through the valve and out of the nozzle (40).

36 Claims, 6 Drawing Sheets

METERING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a metering device for dispensing a metered amount of liquid. In particular, the invention relates to a metering device which has a spool valve to regulate the movement of liquid from the inlet through the storage chamber to the outlet and a dosage ring to limit the movement of the plunger to control the amount of liquid being dispensed.

(2) Description of the Related Art

The related art has shown various types of liquid dispensing devices having metering systems for adjusting the amount of liquid being dispensed. Illustrative are U.S. Pat. No. 4,006,847 to Dooley; U.S. Pat. No. 4,007,855 to Hierath et al; U.S. Pat. No. 4,293,010 to Winiasz; U.S. Pat. No. 4,488,663 to Hooper et al and U.S. Pat. No. 5,458,275 to Centea et al.

Dooley describes a dispensing apparatus which uses various sized sleeves placed around the shaft of the dispensing piston to limit the downward movement of the piston thus, determining the quantity of material which is to be dispensed.

Hooper et al describes a self-metering and dispensing device of fluids obtained from a pressurized fluid supply. The device meters the amount of fluid dispensed by stopping the downward movement of the piston during filling of the device. The means for metering the fluid includes a rotatable ring and several buttons. The ends of the buttons extend into the reservoir adjacent the piston. The buttons are held in place by the rotatable ring. The rotatable ring has cavities such that when a cavity is positioned over a button, the button is slidably forced into the cavity by the movement of the piston, thereby not affecting any movement of the piston. Positioning the ring so that no cavity is over the button, positions the button so that its end portion extends into and is held in place inside the reservoir, stopping the downward movement of the piston by contact between the button and the plunger. To facilitate the proper positioning of the rotatable ring, the ring has numerals which indicate the volume the reservoir was set to retain.

Centea et al describes a hand-held dispensing device which uses an adjustment screw to limit the movement of the piston during dispensing of the liquid to adjust the amount of liquid dispensed by the device. In this device, the piston is not directly acting on the liquid to dispense the liquid.

The related art has also shown various types of dispensing devices using a spool valve to regulate the movement of the liquid into and out of the device and to dispense the liquid. Illustrative are U.S. Pat. No. 4,005,281 to Rosen et al; U.S. Pat. Nos. 4,650,099 and 4,821,927 both to Paulsen et al. In particular, '099 and '927 to Paulsen et al describe a gun for repeatedly dispensing precisely metered quantities of liquid from a pressurized source. The gun includes a valve spool. In a first position, the valve spool section blocks the outlet portion of the valve chamber while permitting the flow of pressurized liquid into a metering chamber of the gun. In a second position, both the inlet and outlet ports of the valve chamber are blocked thus stopping the flow of liquid. In the third position, the inlet port is blocked while permitting communication between the liquid contained in the metering chamber and the discharge nozzle of the gun. To regulate the amount of liquid dispensed by the gun, an adjustment stop is positioned so as to engage the piston to prevent movement of the piston during filling of the metering chamber.

There remains a need for a dispensing device which uses a metering system which limits the travel of the plunger during dispensing to vary the dosage of the fluid being dispensed.

SUMMARY OF THE INVENTION

A device for dispensing a metered amount of liquid from a pressurized source of liquid. The device includes a storage container, a valve and a metering system. The storage container contains a plunger slidably mounted in the inner chamber of the storage container. The valve is preferably a spool valve which allows for completely closing the inlet before the outlet is opened to reduce the possibility of inaccuracies in the amount of liquid dispensed. The metering system includes a dosage ring with a pin. The ring mounts on the outer surface of the storage container adjacent a dosage slot. The pin extends through the slot in the sidewall of the container and into a slot in the sidewall of the plunger. The pin contacts the bottom end of the slot in the plunger to stop the forward movement of the plunger during dispensing of the liquid thus, stopping the forward movement of the plunger and stopping the pressure on the liquid tending to move the liquid out of the storage container through the valve and out of the nozzle. The slot has side dosage notches to fix the ring in place at a specific dosage. The device is preferably fully mechanical to increase the ease of use and to reduce the possibility of parts failure due to environmental conditions.

The present invention relates to a device for dispensing a predetermined amount of liquid which comprises: a storage container having a first end and a second end defining a longitudinal axis of the storage container with an inner chamber spaced between the ends and having an orifice in the first end in fluid communication with the inner chamber; a plunger slidably mounted in the inner chamber of the storage container; a means mounted in the inner chamber adjacent the plunger for biasing the plunger toward the orifice of the storage container; a dosage ring slidably mounted on the storage container, wherein the dosage ring determines the amount of liquid dispensed by contacting the plunger during movement of the plunger during dispensing of the liquid to stop movement of the plunger and to stop dispensing of the liquid; and a valve connected to the storage container configured to allow the liquid to move into and out of the storage container.

Further, the present invention relates to a device for dispensing a predetermined amount of liquid which comprises: a storage container having a first end and a second end defining a longitudinal axis of the storage container with an inner chamber spaced between the ends and having an orifice in the first end in fluid communication with the inner chamber; a plunger slidably mounted in the inner chamber of the storage container; a means mounted in the inner chamber adjacent the plunger for biasing the plunger toward the orifice of the storage container; a dosage ring slidably mounted on the storage container, wherein the dosage ring determines the amount of liquid dispensed by contacting the plunger during dispensing of the liquid to stop the movement of the plunger and to stop the dispensing of the liquid; and a valve connected to the storage container configured to allow the liquid to move into and out of the storage container, the valve including a body with an inner chamber, an inlet configured to be connected to a source of liquid, an inlet/outlet in fluid communication with the orifice of the storage container, an outlet for dispensing liquid from the dispenser, wherein the inlet, outlet and inlet/outlet are in fluid communication with the inner chamber of the valve, and a rod slidably mounted in the inner chamber of the valve and configured to open and close the inlet, outlet and inlet/outlet to control the dispensing of the liquid, wherein in use when the valve is in a fill position, the liquid will enter the inner chamber of the valve through the inlet and will exit the inner chamber of the valve through the inlet/outlet and will enter the inner chamber of the storage container through the orifice and wherein in use when the valve is in a dispense position, the liquid will exit the inner chamber of the storage container through the orifice and will enter the inner chamber of the valve through the inlet/outlet and will exit the inner chamber of the valve through the outlet so that the liquid is dispensed.

Still further, the present invention relates to a system for dispensing a predetermined amount of liquid, which comprises: a source of the liquid having an outlet and a means for moving the liquid through the outlet under pressure; a device which includes a storage container having a first and second end defining a longitudinal axis of the storage container with an inner chamber spaced between the ends and having an orifice in the first end; a plunger slidably mounted in the inner chamber of the storage container; a means mounted in the inner chamber of the storage container adjacent the plunger for biasing the plunger toward the orifice; a dosage ring slidably mounted on the storage container wherein, the dosage ring determines the amount of liquid dispensed by contacting the plunger during movement of the plunger during dispensing of the liquid, to stop movement of the plunger and to stop dispensing of the liquid; and a valve connected to the storage container configured to allow the liquid to move into and out of the storage container.

Further still, the present invention relates to a system for dispensing a predetermined amount of liquid, which comprises: a source of the liquid having an outlet and a means for moving the liquid through the outlet under pressure; a device which includes a storage container having a first and second end defining a longitudinal axis of the storage container with an inner chamber spaced between the ends and having an orifice in the first end; a plunger slidably mounted in the inner chamber of the storage container; a means mounted in the inner chamber of the storage container adjacent the plunger for biasing the plunger toward the orifice; a dosage ring slidably mounted on the storage container wherein, the dosage ring determines the amount of liquid dispensed by contacting the plunger during movement of the plunger during dispensing of the liquid, to stop movement of the plunger and to stop dispensing of the liquid; and a valve connected to the storage container configured to allow the liquid to move into and out of the storage container, the valve having a body with an inner chamber, an inlet configured to be connected to the source of liquid, an inlet/outlet in fluid communication with the orifice of the storage container, an outlet for dispensing the liquid from the device, wherein the inlet, outlet and inlet/outlet are in fluid communication with the inner chamber of the valve, and a rod slidably mounted in the inner chamber of the valve and configured to open and close the inlet, outlet and inlet/outlet to control the dispensing of the liquid wherein in use, when the valve is in a fill position, the liquid will move from the source of liquid to the storage container through the valve and wherein, in use, when the valve is in a dispense position, the predetermined amount of liquid will be dispensed from the storage container through the valve and out the outlet of the valve.

Finally, the present invention relates to a method for dispensing a predetermined amount of liquid, which comprises the steps of: providing a device having a storage container having opposed ends defining a longitudinal axis of the storage container with an inner chamber spaced between the ends and having an orifice in one of the ends in fluid communication with the inner chamber; a plunger slidably mounted in the inner chamber of the storage container; a means mounted in the inner chamber adjacent the plunger for biasing the plunger toward the orifice of the storage container; a dosage ring mounted on the storage container; and a valve connected to the storage container for moving the liquid into and out of the storage container; providing a source of liquid having an outlet and a means for moving the liquid through the outlet under pressure; connecting the source of liquid to the valve with the valve in a fill position such that the liquid under pressure moves from the source of liquid through the valve and into the inner chamber of the storage container; moving the dosage ring along the longitudinal axis of the storage container to a predetermined dosage; and moving the valve to a dispense position such that the plunger moves toward the orifice of the storage container and pushes the liquid in the inner chamber of the storage container out of the orifice of the storage container through the valve so that the liquid is dispensed through an outlet of the valve until the plunger contacts the dosage ring which stops the movement of the plunger such that the liquid in the inner chamber of the storage container does not move out of the orifice of the storage container.

DESCRIPTION OF THE PREFERRED EMBODIMENTS

Figure 1:
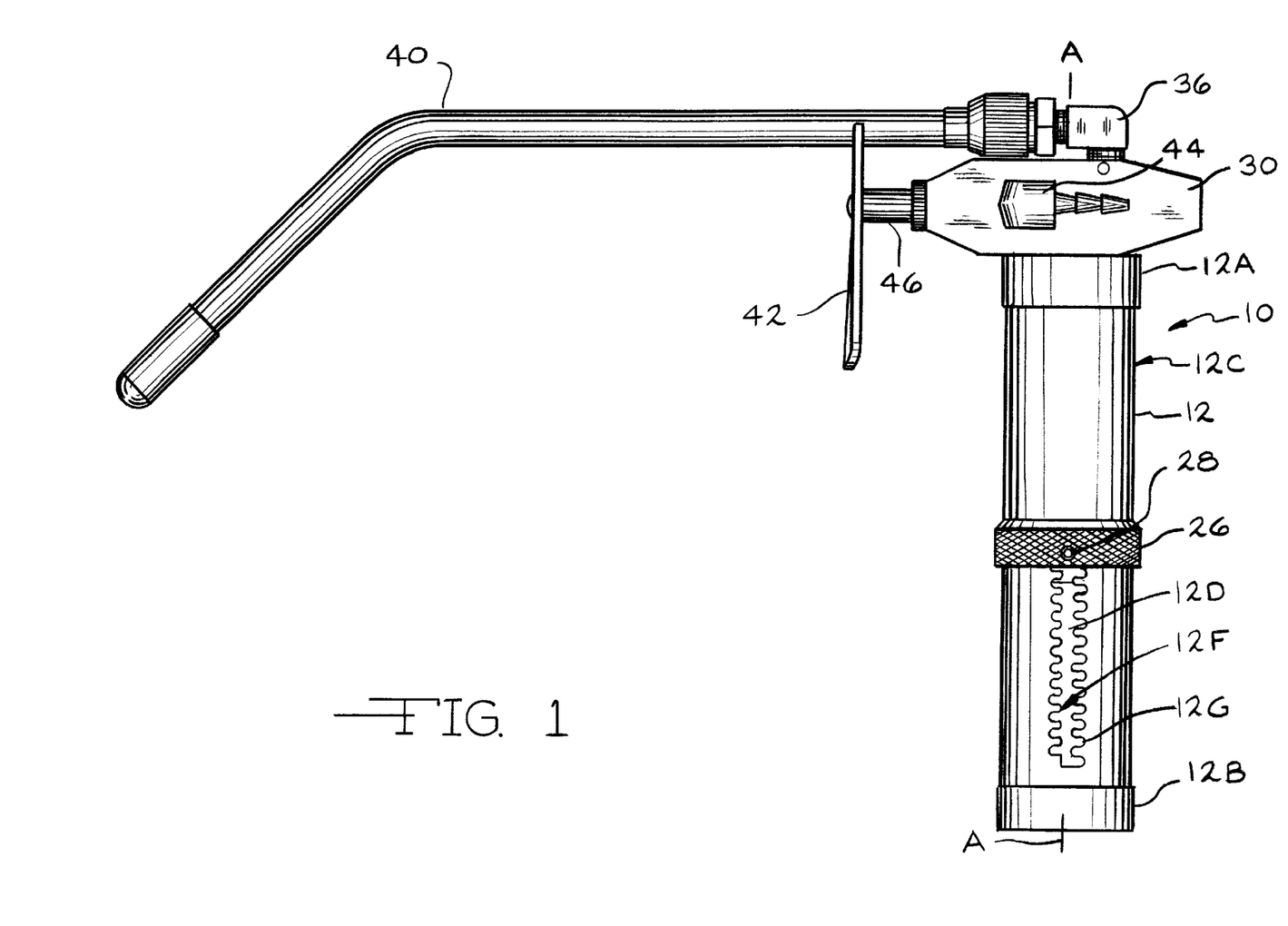
FIG. 1 is a side view of the metering device 10 showing the storage container 12 and the nozzle 40.
Figure 2:
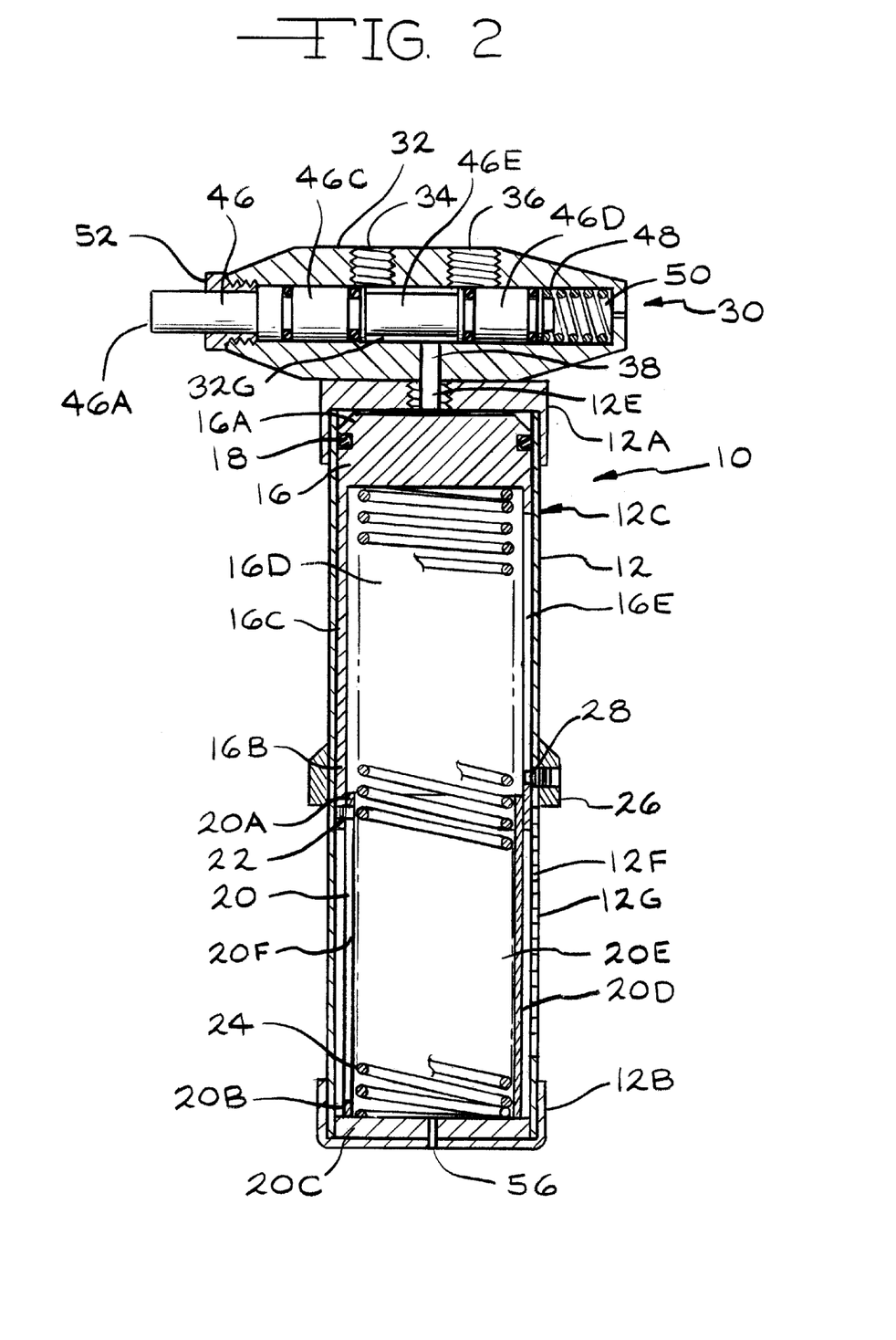
FIG. 2 is a cross-sectional view of the metering device 10 with the plunger 16 in the fully extended, unfilled position showing the dosage ring 26 with the pin 28 extending through the slot 12F in the storage container 12 and the slot 16E in the plunger 16.
Figure 3:
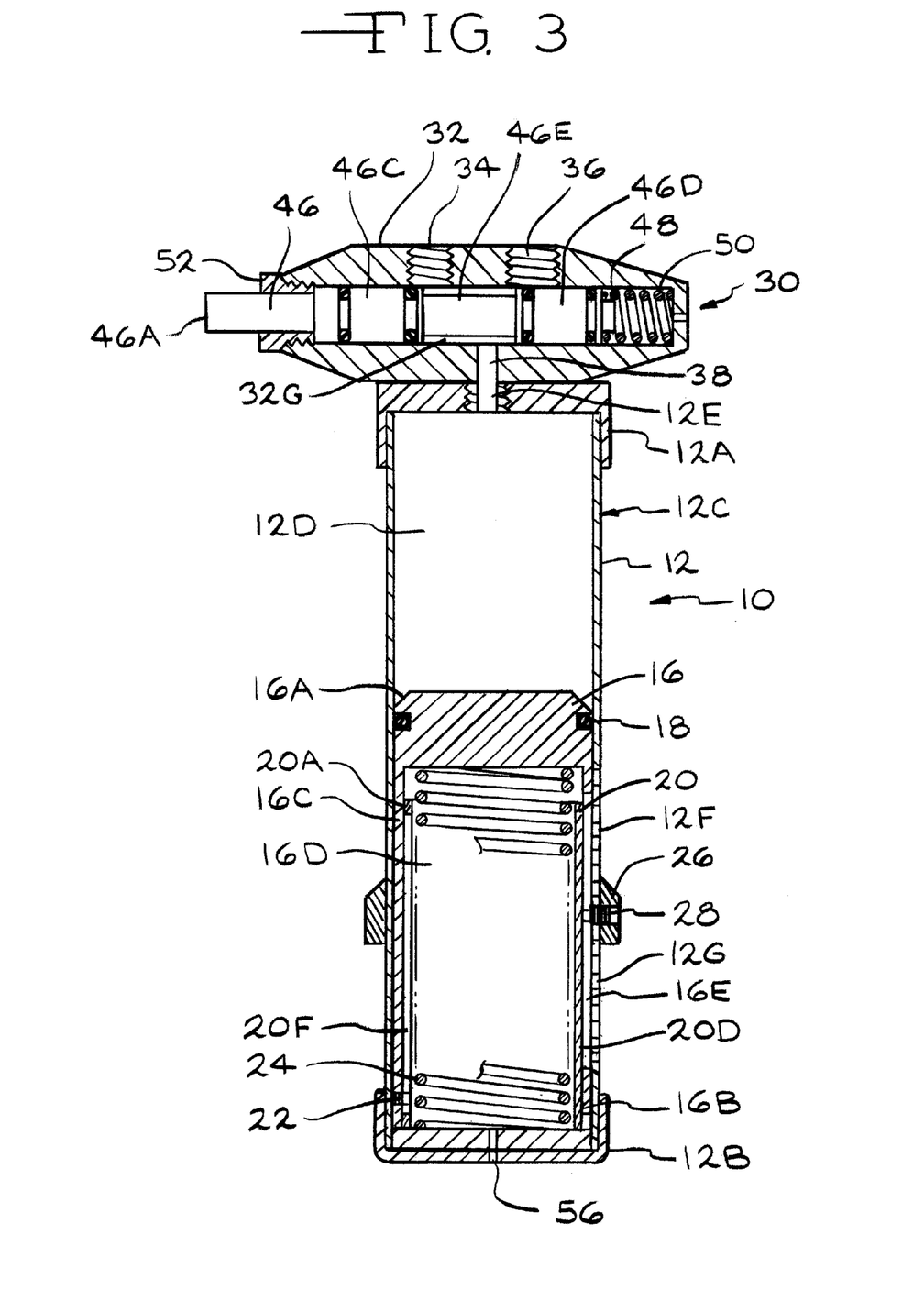
FIG. 3 is a cross-sectional view of the metering device 10 in the filled position.

FIGS. 1 to 3 show the metering device 10 of the present invention. The device 10 is intended to be used with a pressurized source of fluid 100 to dispense a predetermined amount of fluid; particularly a liquid. In one (1) embodiment, the device 10 is used to dispense pesticides, insecticides and herbicides directly onto animals; particularly, livestock. However, the device 10 could also be used to dispense medications, paints, chemicals, water or any other liquid where precise volumes must be dispensed a dose at a time. The dispensed liquid may be sprayed, injected, drizzled or dropped depending on the type of nozzle used.

The metering device 10 includes a storage container 12, a valve 30 and a dispensing nozzle 40. The storage container 12 preferably has a cylindrical shape with a top end 12A and a bottom end 12B with a cylindrical sidewall 12C therebetween forming a cylindrical inner chamber 12D between the ends 12A and 12B along a longitudinal axis A—A of the storage container 12 (FIG. 1). The top end 12A of the storage container 12 has an orifice 12E which allows for filling the inner chamber 12D with a liquid and dispensing the liquid from the inner chamber 12D. In one (1) embodiment, the top and bottom ends 12A and 12B of the container 12 are closed by end caps which are mounted to the cylindrical sidewall 12C of the container 12. The end caps can be either permanently or removably mounted to the ends 12A and 12B of the storage container 12. The sidewall 12C of the storage container 12 adjacent the bottom end 12B of the storage container 12 is provided with a vertical dosage slot 12F parallel to the longitudinal axis A—A of the storage container 12 having horizontal side dosage notches 12G. The length of the slot 12F depends on the variety of dosages provided by the device 10. The dosage notches 12G are spaced apart such as to provide specific dosages of the liquid when a specific notch 12G is selected by the dosage ring 26. The sidewall 12C of the storage container 12 adjacent the notches 12G is preferably provided with indicia (not shown) which identify the specific dosage for each notch 12G.

A plunger 16 is slidably mounted in the inner chamber 12D of the storage container 12. The plunger 16 has a cylindrical shape with an outer diameter slightly less than the inner diameter of the inner chamber 12D of the storage container 12. The plunger 16 has a top end 16A or head and a bottom end 16B with a sidewall 16C therebetween forming a hollow, inner chamber 16D. The sidewall 16C has a slot 16E which is spaced between the ends 16A and 16B of the plunger 16. The length of the slot 16E depends on the variety of dosages provided by the device 10. In one (1) embodiment, the slot 16E extends essentially the entire length of the plunger 16. The width of the slot 16E is preferably greater than the maximum width of the slot 12F in the sidewall 12C of the storage container 12 between the notches 12G. The bottom end 16B of the plunger 16 is open such that the spring 24 and spring cover 20 (to be described in detail hereinafter) can extend into the hollow inner chamber 16D. The head 16A of the plunger 16 is provided with an o-ring 18 which seals the plunger head 16A in contact with the inner sidewall of the inner chamber 12D of the storage container 12.

The spring cover 20 is fixably mounted in the inner chamber 12D of the storage container 12 adjacent the bottom end 12B of the storage container 12. The spring cover 20 has a cylindrical shape with an open top end 20A and a closed bottom end 20B with a bottom end plate 20C at the bottom end 20B and a sidewall 20D extending between the top end 20A and the bottom end 20B forming an inner chamber 20E. The bottom plate 20C of the spring cover 20 has a diameter only slightly less than the inner diameter of the inner chamber 12D of the storage container 12. The outer diameter of the sidewall 20D of the spring cover 20 is slightly less than the inner diameter of the sidewall 16C of the plunger 16 such that the top end 20A of the spring cover 20 can extend into the open bottom end 16B of the plunger 16. The sidewall 20C of the spring cover 20 has a vertical slot 20F extending between the ends 20A and 20B. A securing screw 22 is mounted through the sidewall 16C of the plunger 16 adjacent the bottom end 16B and into the slot 20F in the spring cover 20. The securing screw 22 and slot 20F allow for slidably securing the spring cover 20 to the plunger 16.

A spring 24 is preferably located in the inner chamber 16D of the plunger 16 and the inner chamber 20D of the spring cover 20 between the bottom side of the plunger head 12A and the bottom plate 20B of the spring cover 20. The spring 24 is preferably a compression spring; however, it is understood that any well known biasing means could be used. The strength of the spring 24 determines the force at which the liquid will be expelled. Higher spring forces are needed for more viscous liquids or if the liquid needs to be injected or atomized upon delivery. The spring cover 20 preferably extends the length of the spring 24 when the plunger 16 is in the fully compressed position. The spring cover 20 preferably determines the full compression of the plunger 16.

The metering or dosage ring 26 is slidably mounted around the outer surface of the sidewall 12C of the storage container 12 adjacent the dosage slot 12F. The dosage ring 26 is provided with a pin 28 which extends into one (1) of the dosage notches 12G as selected by the user. The pin 28 is preferably threadably mounted in the metering ring 26 to allow for easy removal of the metering ring 26. The pin 28 is of such a length as to extend through the slot 12F in the storage container 12 and into the slot 16E in the sidewall 16C of the plunger 16.

The valve 30 for regulating the movement of liquid into and out of the storage container 12 is preferably a three-way valve such as a spool valve having a valve body 32 with an inner chamber 32G. The valve body 32 also has an inlet 34, an outlet 36 and an inlet/outlet or fill port 38 all in fluid communication with the inner chamber 32A of the valve body 32. In one (1) embodiment, the valve/body 32 has a top wall 32A and a bottom wall 32B with left and right sidewalls 32C and 32D extending therebetween. The valve body 32 also has a front end 32E and a back end 32F. The inlet 34 for the valve body 32 is preferably located in the right sidewall 32D of the valve body 32 and extends into the inner chamber 32G so that the inlet 34 is in fluid communication with the inner chamber 32G. The outlet 36 is preferably located in the top wall 32A of the valve body 32. A barbed male connector 44 is preferably mounted in the inlet 34 of the valve body 32. The barbed male connector 44 allows for connection of a fill hose 102 from the source of pressurized liquid 100. The outlet 36 preferably has internal threads to allow for removably mounting the nozzle 40. The nozzle 40 extends outward from the outlet 36 in a direction toward the trigger 42 for the device 10. The length and shape of the nozzle 40 depends on the intended use of the device 10. In one (1) embodiment, the nozzle 40 is of such a length as to allow dispensing of the liquid a distance from the storage container 12. The fill port 38 is preferably located in the bottom wall 32B of the valve body 32. The fill port 38 of the valve body 32 is configured to be removably mounted in the orifice 12E in the top end 12A of the storage container 12 such that the inner chamber 12D of the storage container 12 is in fluid communication with the inner chamber 32G of the valve body 32.

A movable member or spool 46 is slidably mounted in the inner chamber 32G of the valve body 32. The front end 32E of the valve body 32 is open to allow for insertion of the spool 46 into the inner chamber 32G. The spool 46 preferably has a cylindrical shape with a first end 46A and a second end 46B with a first section 46C adjacent the first end 46A and a second section 46D adjacent the second end 46B and having a middle section 46E extending between the first and second sections 46C and 46D. The first and second sections 46C and 46D preferably have an outer diameter only slightly less than the inner diameter of the inner chamber 32G of the valve body 32. The first and second sections 46C and 46D are provided with o-rings 48 so that the spool 46 is sealingly in contact with the inner chamber 32G of the valve body 32 adjacent the first and second section 46C and 46D. The middle section 46E of the spool 46 has an outer diameter less than the outer diameter of the first or second section 46C or 46D. A spring 50 is positioned in the inner chamber 32G of the valve body 32 between the second end 46B of the spool 46 and the second end 32B of the valve body 32. The first end 46A of the spool 46 extends beyond the first end 32A of the valve body 32 when the spool 46 is fully extended in the fill position. The open front end 32A of the inner chamber 32G of the valve body 32 has a threaded connector. A threaded cap 52 is mounted around the first end 46A of the spool 46 and is threadably secured in the threaded connector at the first end 32A of the valve body 32 and acts to slidably secure the spool 46 in the inner chamber 32G of the valve body 32.

Figure 4:
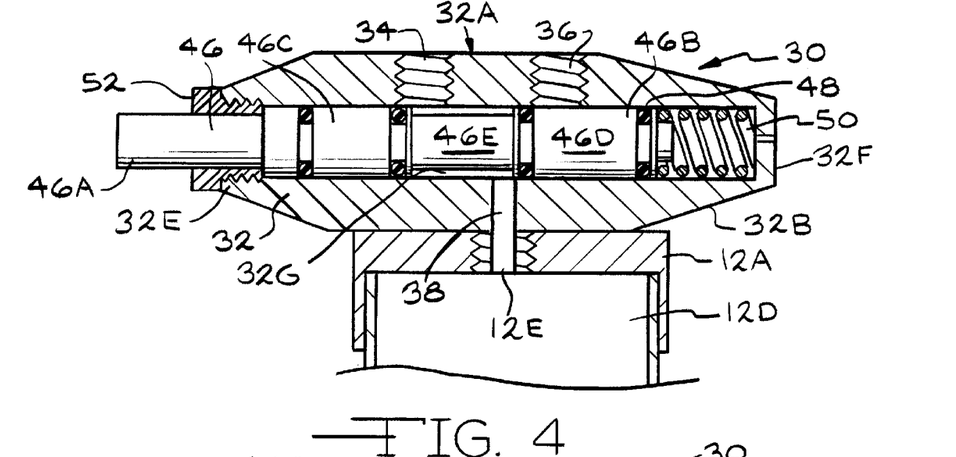
FIG. 4 is a schematic view of the valve 30 with the inlet 34 shown offset showing the valve 30 in the fill position.
Figure 5:
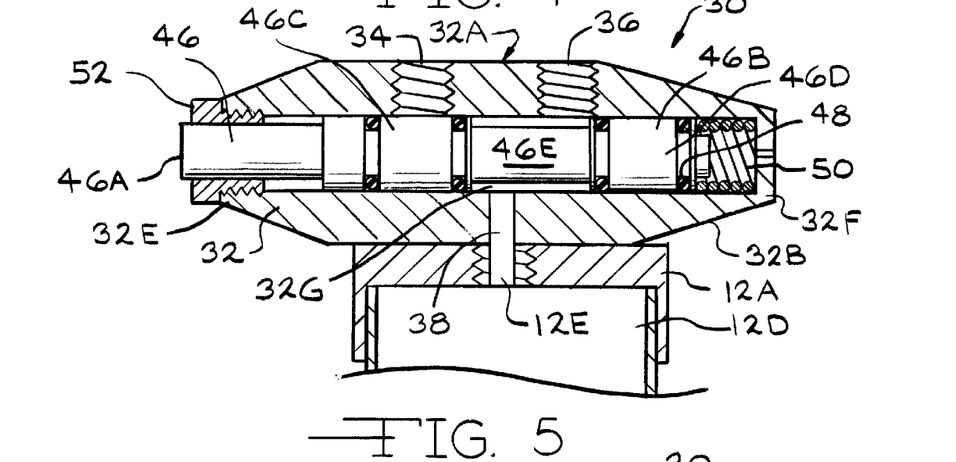
FIG. 5 is a schematic view of the valve 30 with the inlet 34 offset showing the valve 30 in the dispense position.
Figure 6:
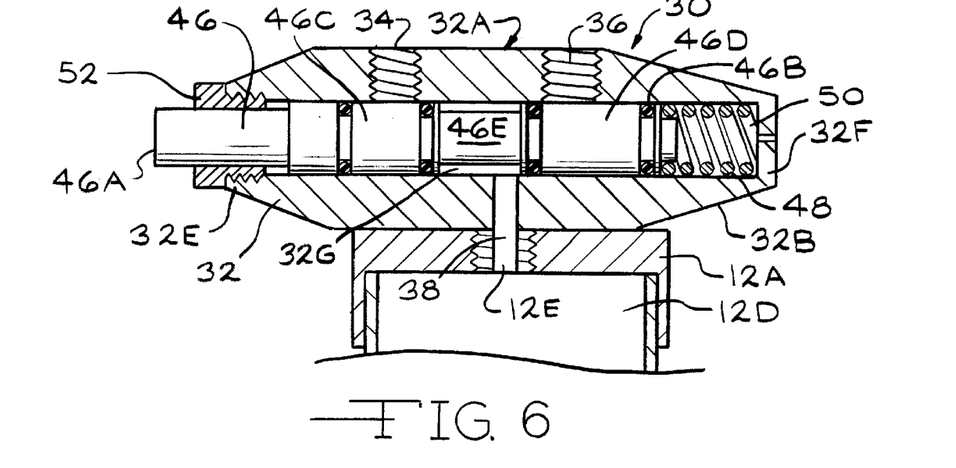
FIG. 6 is a schematic view of the valve 30 with the inlet 34 offset showing the valve 30 in an intermediate position between the fill position and the dispense position.
Figure 7:
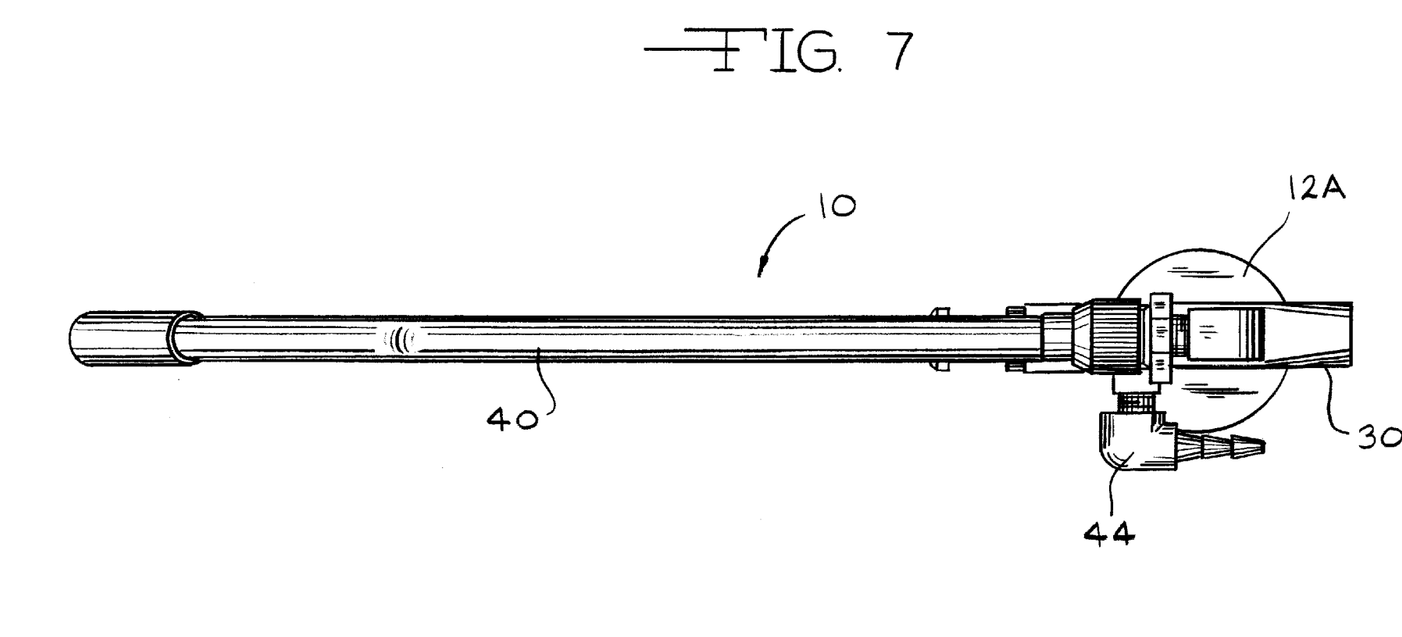
FIG. 7 is a top plan view of the metering device 10.
Figure 8:
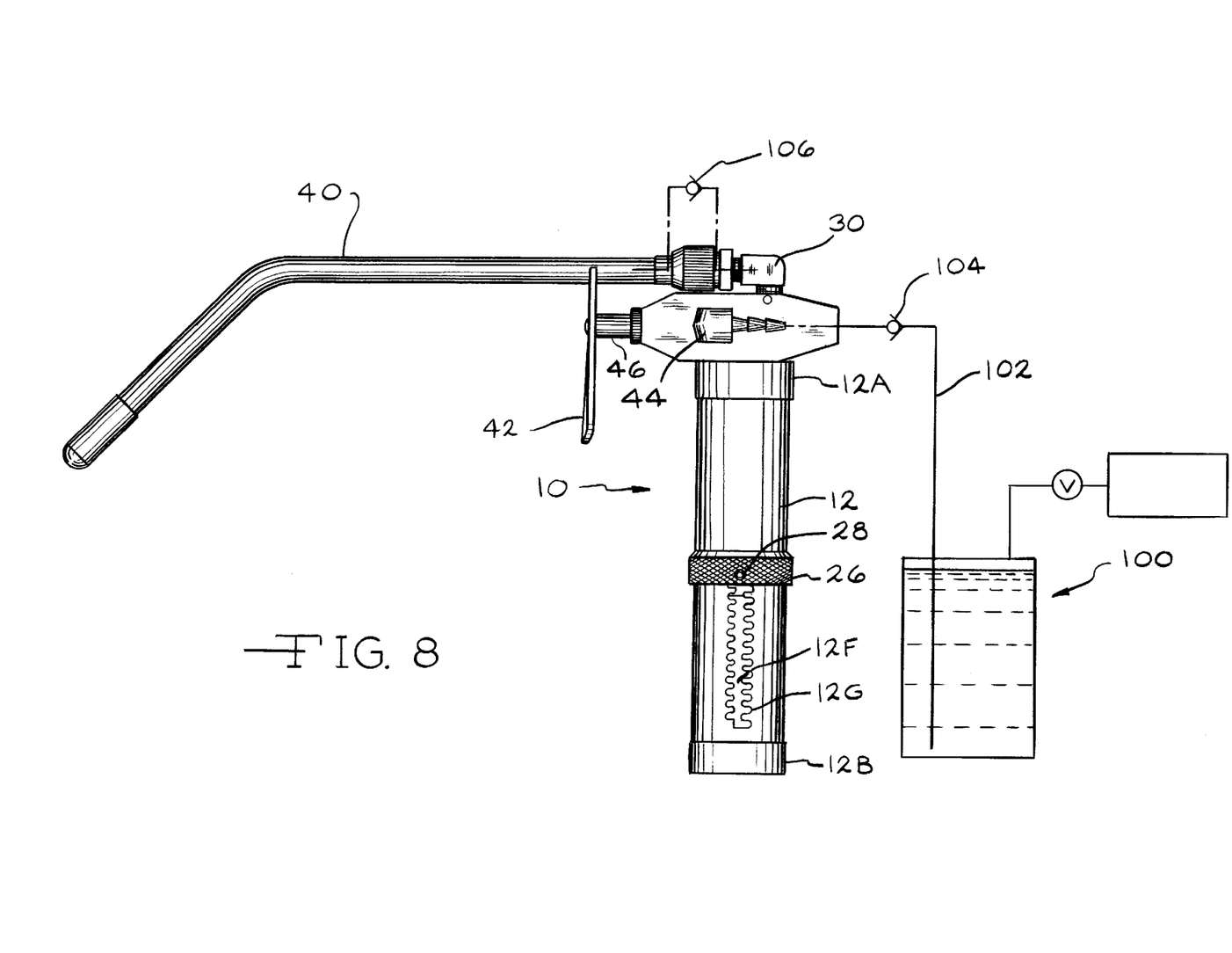
FIG. 8 is a schematic representation of the dispensing system 10 showing the source of liquid 100 connected to the metering device 10.

A trigger 42 is mounted on the first end 46A of the spool 46. The trigger 42 allows for activating the valve 30 by pushing the spool 46 of the valve 30 into the inner chamber 32G of the valve body 32. The trigger 42 also prevents the spool 46 from completely entering the inner chamber 32G. In one (1) embodiment, the spool 46 is of such a length and the first and second sections 46C and 46D are positioned such that when the spool 46 is fully extended, the valve 30 is in the fill position with the second section 46D blocking or closing the outlet 36 and with the inlet 34 and the fill port 38 adjacent the middle section 46E such that both are in fluid communication with the inner chamber 12D of the storage container 12 and the inner chamber 32G of the valve body 32 (FIG. 4). Preferably, when the trigger 42 is fully pulled, the spool 46 extends into the inner chamber 32G to the dispense position with the first section 46C of the spool 46 blocking or closing off the inlet 34 and the middle section 46E adjacent the outlet 36 and the fill port 38 such that the fill port 38 and outlet 36 are in fluid communication with the inner chamber 12D of the storage container 12 and the inner chamber 32G of the valve body 32 (FIG. 5). The sections 46C, 46D and 46E of the spool 46 are located such that in an intermediate position, as the valve 30 moves between the fill and dispense positions, both the inlet 34 and the outlet 36 are closed at the same time such that both the inlet 34 and the outlet 36 are never in fluid communication with the inner chamber 12D of the storage container 12 and the inner chamber 32G of the valve body 32 at the same time.

In the initial position when the storage container 12 is empty or essentially empty, the spring 50 of the valve 30 biases the valve 30 to the fill position (FIG. 4). The inner chamber 12D of the storage container 12 can be either completely empty or partially empty in the case when the device 10 was used previously and the entire amount of liquid in the inner chamber 12D of the storage container 12 was not dispensed. When the storage container 12 is completely empty, the spring 50 is fully extended and the top end 16A of the plunger 16 is adjacent the top end 12A of the storage container 12. To use the device 10, the storage container 12 must first be filled with the liquid to be dispensed. To fill the storage container 12, the inlet 34 of the valve 30 is connected to a source of pressurized liquid 100. The liquid from the source of liquid 100 moves through the fill hose 102 into the inlet 34 of the valve body 32 and into the inner chamber 32G of the valve body 32. The liquid then moves out of the valve body 32 through the fill port 38 into the inner chamber 12D of the storage container 12. To operate correctly, the pressure of the liquid must be high enough to overcome the force of the spring 24 pushing on the plunger 16. The source of liquid 100 could be an electronically powered pump, a pressurized vessel or any other well known source of pressurized fluid. As the liquid moves into the inner chamber 12D of the storage container 12, the force of the liquid pushes on the top 16A of the plunger 16 compressing the spring 24 and forcing the plunger 16 toward the bottom end 12B of the storage container 12. The bottom end 12B of the storage container 12 is provided with an air escape opening 56 which allows air in the inner chamber 12D to escape from the inner chamber 12D as the inner chamber 12D is filled with liquid. If continuous pressure can not be provided, a check valve 104 is preferably provided at the inlet 34 to prevent the liquid from being forced back through the inlet 34 to the source of liquid 100. When the top end 16A of the plunger 16 contacts the top end 20A of the spring cover 20, the inner chamber 12D is completely full. In one (1) embodiment, the source of liquid 100 automatically shuts off when no more liquid is able to be pumped into the storage container 12. In another embodiment, the source of liquid 100 is shut-off by the user when the storage container 12 is full. When the inner chamber 12D of the storage container 12 is full, the user sets the dosage ring 26 to the correct dosage. To set the dosage ring 26, the user rotates the ring 26, if necessary, to move the pin 28 out of a dosage notch 12G into the slot 12F. The user than moves the dosage ring 26 up or down the slot 12F, along the longitudinal axis A—A of the container 12 until the pin 28 is located adjacent the correct dosage. The user then rotates the ring 26 to move the pin 28 into the side dosage notch 12G associated with the correct dosage. Once the dosage is set, the user positions the nozzle 40 at the correct location and pulls the trigger 42 of the valve 30. As the spool 46 moves from the fill position to the dispense position, the first section 46C of the spool 46 closes off the inlet 34. Once the inlet 34 is fully closed, the second section 46D moves beyond the outlet 36 such that the middle section 46E of the valve 30 is adjacent the outlet 38. Throughout the entire movement of the spool 46, the fill port 38 is always adjacent the middle section 46E of the spool 46 such that the inner chamber 12D of the storage container 12 is always in fluid communication with the inner chamber 32G of the valve body 32. When the valve 30 is in the dispense position, the force of the spring 24 in the inner chamber 12D of the storage container 12 moves the plunger 16 toward the orifice 12E in the top end 12A of the storage container 12. As the plunger 16 moves upward, the plunger 16 forces the liquid out of the container 12 through the orifice 12E, through the fill port 38 into the inner chamber 32G of the valve body 32 and out of the valve body 32 through the outlet 36 to be dispensed from the nozzle 40. The plunger 16 moves upward until the pin 28 of the dosage ring 26 contacts the bottom end of the slot 16E in the sidewall 16C of the plunger 16 which stops the movement of the plunger 16. When the plunger 16 contacts the pin 28 or the dosage ring 26, the plunger 26 stops moving. When the plunger 16 stops moving, the liquid is no longer moved through the valve 30. Thus, dispensing of the liquid stops. The pin 28 regulates the amount of liquid being dispensed by stopping the forward movement of the plunger 16. Once the correct amount of liquid is dispensed, the user releases the trigger 42 of the valve 30 and the spring 50 moves the spool 46 back into the fill position. In one (1) embodiment, the amount of liquid dispensed is less than the total amount of liquid in the inner chamber 12D of the storage container 12. If the same amount of liquid is to be dispensed in consecutive uses of the device 10, the inner chamber 12D of the storage container 12 is filled and the trigger 42 is pulled without the need to adjust the dosage ring 26 once the ring 26 is set to the correct dosage in the initial use.

It is intended that the foregoing description be only illustrative of the present invention and that the present invention be limited only by the hereinafter appended claims.

I claim:

1. A device for dispensing a predetermined amount of liquid which comprises:
    (a) a storage container having a first end and a second end defining a longitudinal axis of the storage container with a sidewall extending between the ends forming an inner chamber spaced between the ends with an opening in the sidewall extending into the inner chamber and having an orifice in the first end in fluid communication with the inner chamber;
    (b) a plunger slidably mounted in the inner chamber of the storage container so that the liquid can be dispensed through the orifice;
    (c) a means mounted in the inner chamber adjacent the plunger for biasing the plunger toward the orifice of the storage container;
    (d) a dosage ring slidably mounted on the storage container, wherein the dosage ring determines the amount of liquid dispensed by contacting the plunger through the opening in the sidewall of the container during movement of the plunger during dispensing of the liquid to stop movement of the plunger and to stop dispensing of the liquid; and
    (e) a valve connected to the storage container configured to allow the liquid to move into and out of the storage container.

2. The device of claim 1 wherein the storage container has a cylindrical shape and wherein the opening in the sidewall of the container is a slot extending through the sidewall along the longitudinal axis of the storage container, the slot having a plurality of notches extending perpendicular to the slot.

3. The device of claim 2 wherein the dosage ring is mounted around an outer surface of the storage container, the dosage ring having a pin which extends through the slot in the sidewall of the storage container into the inner chamber of the storage container wherein to adjust the amount of liquid to be dispensed, the dosage ring is moved along the slot to a predetermined dosage and then the dosage ring is rotated to move the pin into the one of the plurality of notches for the predetermined dosage.

4. The device of claim 3 wherein the pin has a length such as to extend into the inner chamber of the storage container so that, in use, as the liquid is being dispensed, the plunger moves toward the orifice until the plunger contacts the pin which stops the movement of the plunger and stops the dispensing of the liquid.

5. The device of claim 4 wherein the plunger has a first end and a second end with a sidewall extending therebetween and having an opening extending through the sidewall spaced between the first and second ends wherein the pin of the dosage ring is in the opening in the sidewall when the plunger is moving, and contacts an end of the opening adjacent the second end of the plunger to stop the movement of the plunger and to stop the dispensing of liquid when the predetermined amount of liquid has been dispensed.

6. The device of claim 1 wherein the means for biasing the plunger toward the orifice is a coil spring, wherein the plunger has a first end and a second end with a sidewall extending therebetween forming an inner chamber, wherein the second end has an opening and wherein the coil spring extends between the second end of the storage container and the first end of the plunger in the inner chamber of the plunger.

7. The device of claim 6 wherein the coil spring is mounted in an inner chamber of a spring liner, the spring liner having an open, first end and a closed, second end with a sidewall extending therebetween forming the inner chamber of the spring liner, wherein the spring liner is mounted around the coil spring such that the open, first end of the spring liner extends into the second end of the plunger, and wherein the coil spring extends between the first end of the plunger and the second end of the spring liner.

8. A device for dispensing a predetermined amount of liquid which comprises:
    (a) a storage container having a first end and a second end defining a longitudinal axis of the storage container with an inner chamber spaced between the ends and having an orifice in the first end in fluid communication with the inner chamber;
    (b) a plunger slidably mounted in the inner chamber of the storage container;
    (c) a means mounted in the inner chamber adjacent the plunger for biasing the plunger toward the orifice of the storage container;
    (d) a dosage ring slidably mounted on the storage container, wherein the dosage ring determines the amount of liquid dispensed by contacting the plunger during dispensing of the liquid to stop the movement of the plunger and to stop the dispensing of the liquid; and
    (e) a valve connected to the storage container configured to allow the liquid to move into and out of the storage container, the valve including a body with an inner chamber, an inlet configured to be connected to a source of liquid, an inlet/outlet in fluid communication with the orifice of the storage container, an outlet for dispensing liquid from the dispenser, wherein the inlet, outlet and inlet/outlet are in fluid communication with the inner chamber of the valve, and a rod slidably mounted in the inner chamber of the valve and configured to open and close the inlet, outlet and inlet/outlet to control the dispensing of the liquid, wherein in use when the valve is in a fill position, the liquid will enter the inner chamber of the valve through the inlet and will exit the inner chamber of the valve through the inlet/outlet and will enter the inner chamber of the storage container through the orifice and wherein in use when the valve is in a dispense position, the liquid will exit the inner chamber of the storage container through the orifice and will enter the inner chamber of the valve through the inlet/outlet and will exit the inner chamber of the valve through the outlet so that the liquid is dispensed.

9. The device of claim 8 wherein the body of the valve has a first side with an opposed second side and a third side with an opposed fourth side and wherein the outlet is located in the first side, the inlet/outlet is located in the second side and the inlet is located in the third side.

10. The device of claim 8 wherein the valve is a spool valve.

11. The device of claim 10 wherein the inner chamber of the valve has a cylindrical shape and wherein the rod of the valve is a spool and has a cylindrical shape, wherein the spool has opposed first and second ends with a first portion adjacent the first end, a second portion adjacent the second end and a third portion spaced between the first and second portions, and wherein the third portion of the spool has an outer diameter less than an outer diameter of the first portion and the second portion of the spool.

12. The device of claim 11 wherein a biasing means is positioned in the inner chamber of the valve adjacent the spool and wherein the biasing means tends to move the spool into the fill position.

13. The device of claim 11 wherein when the spool is in the fill position, the spool is in a fully extended position with the first portion of the spool adjacent to and closing the outlet and with the third portion of the spool adjacent to the inlet and the inlet/outlet such that in use, the liquid will move into the inner chamber of the valve through the inlet of the valve and through the orifice of the storage container into the inner chamber of the storage container.

14. The device of claim 8 wherein the inlet of the valve is provided with a check valve such that the liquid does not escape from the inner chamber of the valve through the inlet.

15. The device of claim 8 wherein a nozzle is connected to the outlet of the valve and has a length such as to allow dispensing of the liquid a distance from the storage container.

16. The device of claim 8 wherein the storage container has a cylindrical shape with a sidewall extending between the ends and having a slot extending through the sidewall along the longitudinal axis of the storage container, the slot having a plurality of notches extending perpendicular to the slot.

17. The device of claim 16 wherein the dosage ring is mounted around an outer surface of the storage container, the dosage ring having a pin which extends through the slot in the sidewall of the storage container and wherein to adjust the amount of liquid to be dispensed, the ring is moved along the slot to a predetermined dosage and then the ring is rotated to move the pin into one of the plurality of notches.

18. The device of claim 17 wherein the pin has a length such as to extend into the inner chamber of the storage container so that, in use, as the liquid is being dispensed, the plunger moves toward the orifice until the plunger contacts the pin which prevents the plunger from moving and prevents further dispensing of the liquid.

19. The device of claim 18 wherein the plunger has a first end and a second end with a sidewall extending therebetween and having an opening extending through the sidewall spaced between the first and second ends wherein the pin of the dosage ring is in the opening in the sidewall, when the plunger is moving, and contacts an end of the opening adjacent the second end of the plunger to stop the movement of the plunger and to stop the dispensing of liquid when the predetermined amount of liquid has been dispensed.

20. The device of claim 8 wherein the means for biasing the plunger toward the orifice is a coil spring, wherein the plunger has a first end and a second end with a sidewall extending therebetween forming an inner chamber, wherein the second end has an opening and wherein the coil spring is mounted in the inner chamber of the plunger and extends between the second end of the storage container and the first end of the plunger.

21. The device of claim 20 wherein a spring liner is provided having an open, first end and a closed, second end with a sidewall extending therebetween forming an inner chamber of the spring liner, wherein the spring liner is mounted around the coil spring such that the coil spring is mounted in the inner chamber of the spring liner and the open, first end of the spring liner extends into the second end of the plunger, and wherein the coil spring extends between the first end of the plunger and the second end of the spring liner.

22. A system for dispensing a predetermined amount of liquid which comprises:
a source of the liquid having an outlet and a means for moving the liquid through the outlet under pressure;
a device which includes a storage container having a first and second end defining a longitudinal axis of the storage container with a sidewall extending between the ends forming an inner chamber spaced between the ends and with an opening in the sidewall extending into the inner chamber and having an orifice in the first end; a plunger slidably mounted in the inner chamber of the storage container so that the liquid can be dispensed through the orifice; a means mounted in the inner chamber of the storage container adjacent the plunger for biasing the plunger toward the orifice; a dosage ring slidably mounted on the storage container wherein, the dosage ring determines the amount of liquid dispensed by contacting the plunger through the opening in the sidewall of the container during movement of the plunger during dispensing of the liquid, to stop movement of the plunger and to stop dispensing of the liquid; and a valve connected to the storage container configured to allow the liquid to move into and out of the storage container.

23. The system of claim 22 wherein the storage container has a cylindrical shape end wherein the opening in the sidewall of the container is a slot extending through the sidewall along the longitudinal axis of the storage container, the slot having a plurality of notches extending perpendicular to the slot.

24. The system of claim 23 wherein the dosage ring is mounted around an outer surface of the storage container, the dosage ring having a pin which extends through the slot in the sidewall of the storage container into the inner chamber of the storage container wherein to adjust the amount of liquid to be dispensed, the dosage ring is moved along the slot to a predetermined dosage and then the dosage ring is rotated to move the pin into the one of the plurality of notches for the predetermined dosages.

25. The system of claim 24 wherein the pin has a length such as to extend into the inner chamber of the storage container so that, in use, as the liquid is being dispensed, the plunger moves toward the orifice until the plunger contacts the pin which stops the movement of the plunger and stops the dispensing of the liquid.

26. The system of claim 25 wherein the plunger has a first end and a second end with a sidewall extending therebetween and having an opening extending through the sidewall spaced between the first and second ends wherein the pin of the dosage ring is in the opening in the sidewall when the plunger is moving and contacts the second end of the plunger to stop the movement of the plunger and to stop the dispensing of liquid when the predetermined amount of liquid has been dispensed.

27. The system of claim 22 wherein the means for biasing the plunger toward the orifice is a coil spring, wherein the plunger has a first end and a second end with a sidewall extending therebetween forming an inner chamber, wherein the second end has an opening and wherein the coil spring extends between the second end of the storage container and the first end of the plunger in the inner chamber of the plunger.

28. The system of claim 27 wherein the coil spring is mounted in an inner chamber of a spring liner, the spring liner having an open first end and a closed, second end with a sidewall extending therebetween forming the inner chamber of the spring liner, wherein the spring liner is mounted around the coil spring such that the open, first end of the spring liner extends into the second end of the plunger, and wherein the coil spring extends between the first end of the plunger and the second end of the spring liner.

29. A system for dispensing a predetermined amount of liquid, which comprises:
  a source of the liquid having an outlet and a means for moving the liquid through the outlet under pressure;
  a device which includes a storage container having a first and second end defining a longitudinal axis of the storage container with an inner chamber spaced between the ends and having an orifice in the first end; a plunger slidably mounted in the inner chamber of the storage container; a means mounted in the inner chamber of the storage container adjacent the plunger for biasing the plunger toward the orifice; a dosage ring slidably mounted on the storage container wherein, the dosage ring determines the amount of liquid dispensed by contacting the plunger during movement of the plunger during dispensing of the liquid, to stop movement of the plunger and to stop dispensing of the liquid; and a valve connected to the storage container configured to allow the liquid to move into and out of the storage container, the valve having a body with an inner chamber, an inlet configured to be connected to the source of liquid, an inlet/outlet in fluid communication with the orifice of the storage container, an outlet for dispensing the liquid from the device, wherein the inlet, outlet and inlet/outlet are in fluid communication with the inner chamber of the valve, and a rod slidably mounted in the inner chamber of the valve and configured to open and close the inlet, outlet and inlet/outlet to control the dispensing of the liquid wherein in use, when the valve is in a fill position, the liquid will move from the source of liquid to the storage container through the valve and wherein, in use, when the valve is in a dispense position, the predetermined amount of liquid will be dispensed from the storage container through the valve and out the outlet of the valve.

30. The system of claim 29 wherein the valve has a first side with an opposed second side and a third side with an opposed fourth side and wherein the outlet is located in the first side, the inlet/outlet is located in the second side and the inlet is located in the third side.

31. The system of claim 29 wherein the inner chamber of the valve has a cylindrical shape and wherein the rod of the valve is a spool and has a cylindrical shape wherein the spool has opposed first and second ends with a first portion adjacent the first end, a second portion adjacent the second end and a third portion spaced between the first and second portions wherein the third portion of the spool has an outer diameter less than an outer diameter of the first and second portion of the spool.

32. The system of claim 31 wherein a biasing means is positioned in the inner chamber of the valve adjacent the spool and wherein the biasing means tends to move the spool into the fill position.

33. The system of claim 31 wherein when the spool is in the fill position, the spool is in a fully extended position with the first portion of the spool adjacent to and closing the outlet and with the third portion adjacent to the inlet and the inlet/outlet such that in use the liquid from the source of liquid will move into the inner chamber of the valve through the inlet of the valve and through the orifice of the storage container into the inner chamber of the storage container.

34. The system of claim 29 wherein the inlet of the valve is provided with a check valve such that the liquid does not escape from the inner chamber of the valve through the inlet.

35. A method for dispensing a predetermined amount of liquid, which comprises the steps of:
  (a) providing a device having a storage container having opposed ends defining a longitudinal axis of the storage container with an inner chamber spaced between the ends and having an orifice in one of the ends in fluid communication with the inner chamber; a plunger slidably mounted in the inner chamber of the storage container; a means mounted in the inner chamber adjacent the plunger for biasing the plunger toward the orifice of the storage container; a dosage ring mounted on the storage container; and a valve connected to the storage container for moving the liquid into and out of the storage container;
  (b) providing a source of liquid having an outlet and a means for moving the liquid through the outlet under pressure;
  (c) connecting the source of liquid to the valve with the valve in a fill position such that the liquid under pressure moves from the source of liquid through the valve and into the inner chamber of the storage container;
  (d) moving the dosage ring along the longitudinal axis of the storage container to a predetermined dosage; and
  (e) moving the valve to a dispense position such that the plunger moves toward the orifice of the storage container and pushes the liquid in the inner chamber of the storage container out of the orifice of the storage container through the valve so that the liquid is dispensed through an outlet of the valve until the plunger contacts the dosage ring which stops the movement of the plunger such that the liquid in the inner chamber of the storage container does not move out of the orifice of the storage container.

36. The method of claim 35 wherein the storage container has a cylindrical shape with a sidewall extending between the ends and having a slot extending through the sidewall along the longitudinal axis of the storage container, the slot having a plurality of notches extending perpendicular to the slot, wherein the dosage ring is mounted around an outer surface of the storage container, the dosage ring having a pin which extends through the slot in the sidewall of the storage container into the inner chamber of the storage container wherein in step (d) to adjust the amount of liquid to be dispensed, the dosage ring is moved along the slot to the predetermined dosage and then the dosage ring is rotated such that the pin extends into the notch for the predetermined dosage.

* * * * *

UNITED STATES PATENT AND TRADEMARK OFFICE
CERTIFICATE OF CORRECTION

PATENT NO.    : 6,481,596 B1
DATED         : November 19, 2002
INVENTOR(S)   : Christopher Rusnak It is certified that error appears in the above-identified patent and that said Letters Patent is hereby corrected as shown below:

<u>Column 9,</u>
Lines 40 and 41, "a dosage ring slidably mounted on the storage container, wherein" should be deleted and -- a dosage ring mounted on the storage container, wherein the dosage ring is axially slidable on the storage container and -- should be inserted therefor.

<u>Column 12,</u>
Lines 31 and 32, "a dosage ring slidably mounted on the storage container wherein," should be deleted and -- a dosage ring mounted on the storage container, wherein the dosage ring is axially slidable on the storage container and -- should be inserted therefor --.

Signed and Sealed this

Fifteenth Day of April, 2003

JAMES E. ROGAN
*Director of the United States Patent and Trademark Office*